April 1, 1952 F. G. BACK 2,590,916
OPTICAL FOCUSING AND ILLUMINATING DEVICE
FOR PHOTOGRAPHIC CAMERAS AND THE LIKE
Filed Aug. 10, 1950 2 SHEETS—SHEET 1

INVENTOR.
Frank G. Back
BY

ATTORNEY

April 1, 1952 F. G. BACK 2,590,916
OPTICAL FOCUSING AND ILLUMINATING DEVICE
FOR PHOTOGRAPHIC CAMERAS AND THE LIKE
Filed Aug. 10, 1950 2 SHEETS—SHEET 2

INVENTOR.
Frank G. Back
BY

ATTORNEY

Patented Apr. 1, 1952

2,590,916

UNITED STATES PATENT OFFICE 2,590,916

OPTICAL FOCUSING AND ILLUMINATING DEVICE FOR PHOTOGRAPHIC CAMERAS AND THE LIKE

Frank G. Back, Glen Cove, N. Y.

Application August 10, 1950, Serial No. 178,722

1 Claim. (Cl. 95—11)

The present invention relates to optical arrangements and more particularly to specific, cooperating lens arrangements adapted to be employed in conjunction with cameras.

The said lens arrangements provide means for automatically focusing the said camera and furthermore for adequately and evenly illuminating the object to be photographed. The focusing lens arrangement and the illuminating lens arrangement may be used separately; however, if desired, a suitable combination of focusing and illumination means may be conjointly employed by inter-relating the said lens arrangements.

The particular advantages of one of the optical lens arrangements set forth, the focusing arrangement, resides in the fact that the said arrangement provides for focusing means which are exactly adjustable to all requirements and conditions which may be encountered by the user of the camera. More specifically, the arrangement is adaptable to the taking of photographs at short distances, which under ordinary conditions requires considerable skill on the part of the user of the camera in coordinating the focusing means of the camera and correspondingly arranging suitable light conditions.

When taking pictures where short object distances are involved, conventional photographic lenses which are corrected for infinity do produce considerable aberrations which substantially affect the quality of the photograph obtained. When employing the set forth focusing lens arrangements, these particular disadvantages which are specific to short object distance photography are avoided; consequently, the pictures which are obtained in short object distance photography, when the specific lens arrangements are employed, are substantially improved.

According to one of the objects of the invention, an optical system is provided which is adapted to adjust itself to and to compensate for all given conditions, thus eliminating the necessity for altering and adjusting the camera. In this manner, for instance, the timing of the shutter, adjusting of the diaphragm and individual determination of the focal distance, by the photographer is not required.

In adjusting the camera to specific conditions, such as distance and size of the object, object area, etc., a mere interchange or exchange of the lens component of the optical system will adapt the camera to the given condition in a predeterminable manner. Thus the necessity for mechanically adjusting the photographic equipment to individual conditions is substantially dispensed with.

The invention further comprises optical means which in combination with a conventional light source are adapted to illuminate the object and the object area in such manner that said object and its area is illuminated evenly and with high efficiency, the relation of size and object distance being properly taken into consideration.

It is therefore an object of the present invention to provide optical arrangements and more particularly specific lens arrangements and assemblies which in combination with the photographic camera and a light source will furnish correct focusing and correspondingly adjusted illumination of the object when arranged in conjunction with each other.

The specific optical arrangement which is employed to illuminate the object is adapted to provide illumination in such manner as to provide the maximum quantity of light which will be needed during the exposure. This arrangement may be employed separately from the focusing arrangement and represents a new and novel illuminating arrangement suitable for various types of photography. The specific optical arrangement employed for focusing the camera is adapted to provide a new and novel focusing arrangement by the use of which the necessity for mechanically adapting the photographic equipment to specific conditions is substantially eliminated.

Referring again to the optical system which is provided to accomplish the focusing of the camera, used in connection therewith, it is pointed out that the system combines two specific advantages. One of these is that the system permits to adapt the camera to given conditions in a predetermined manner, eliminating the necessity for mechanically adjusting the photographic equipment to varying conditions. The second advantage resides in the fact that this optical system adapts the camera specifically for short objects distance photography, whereby the undesirable aberrations which occur when conventional photographic lenses which are corrected for infinity are employed, are effectively avoided when employing said focusing lens system in combination with the conventional photographic lenses.

The combination of the optical systems set forth provides for a new composite optical arrangement, the advantages of which permit the use of the camera by relatively unskilled users, furnishing correct focusing and illumination conditions without requiring the unskilled users to specifically adjust the camera equipment.

These and other objects and details will be apparent on hand of the description, based on the accompanying drawings which illustrate the various embodiments of my invention.

The set forth embodiments of my invention are illustrated here by way of exemplification without, however, thereby limiting the applicability of the said arrangements, as to other purposes.

Figure 1:
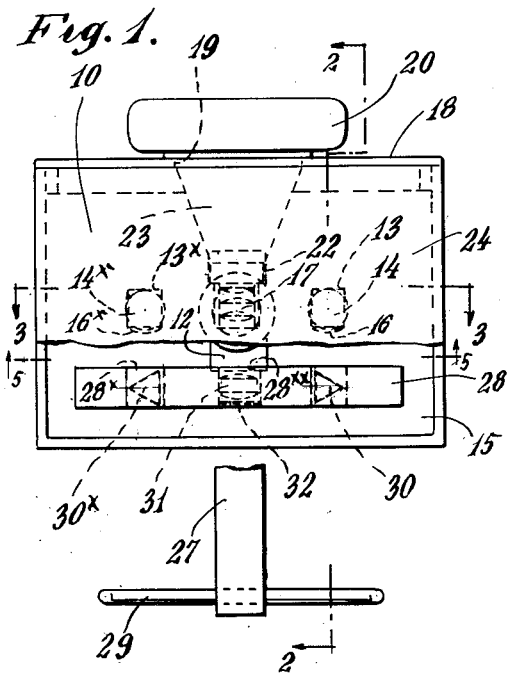
Fig. 1 is a top plan view of the illuminating system and focusing system in combination, and a camera, the arrangement of which embodies my invention.
Figure 2:
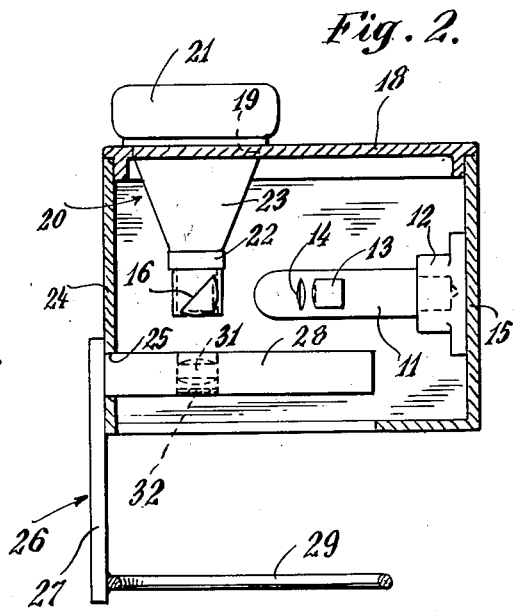
Fig. 2 is a side elevational view of Fig. 1, in cross section along the lines 2—2 of Fig. 1 showing the illuminating system and focusing system in combination with a camera and a light source.
Figure 3:
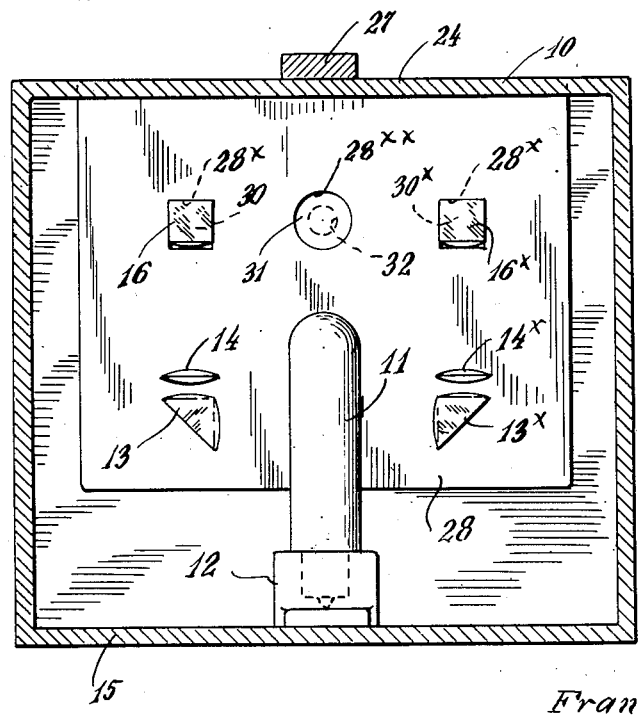
Fig. 3 is a front elevational view along the lines 3—3 of Fig. 1.
Figure 4:
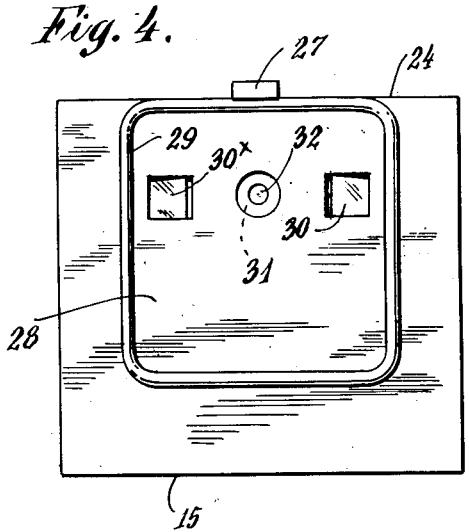
Fig. 4 is a front elevational view of Fig. 1.
Figure 5:
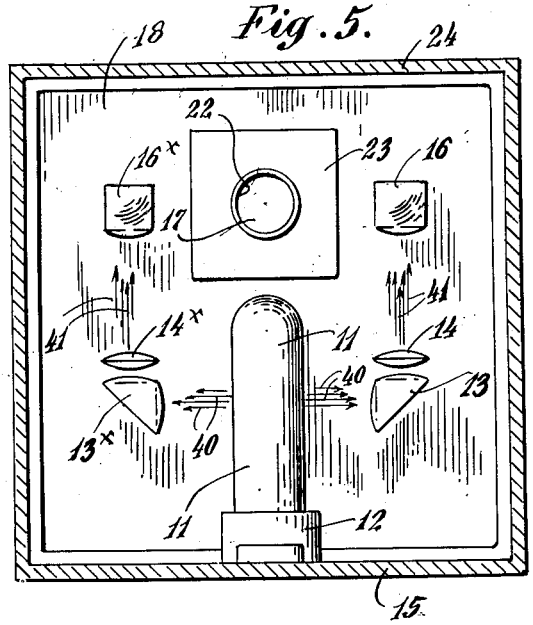
Fig. 5 is a front elevational view of the optical system used for illuminating purposes, schematically setting forth the light ray passage therethrough.
Figure 6:
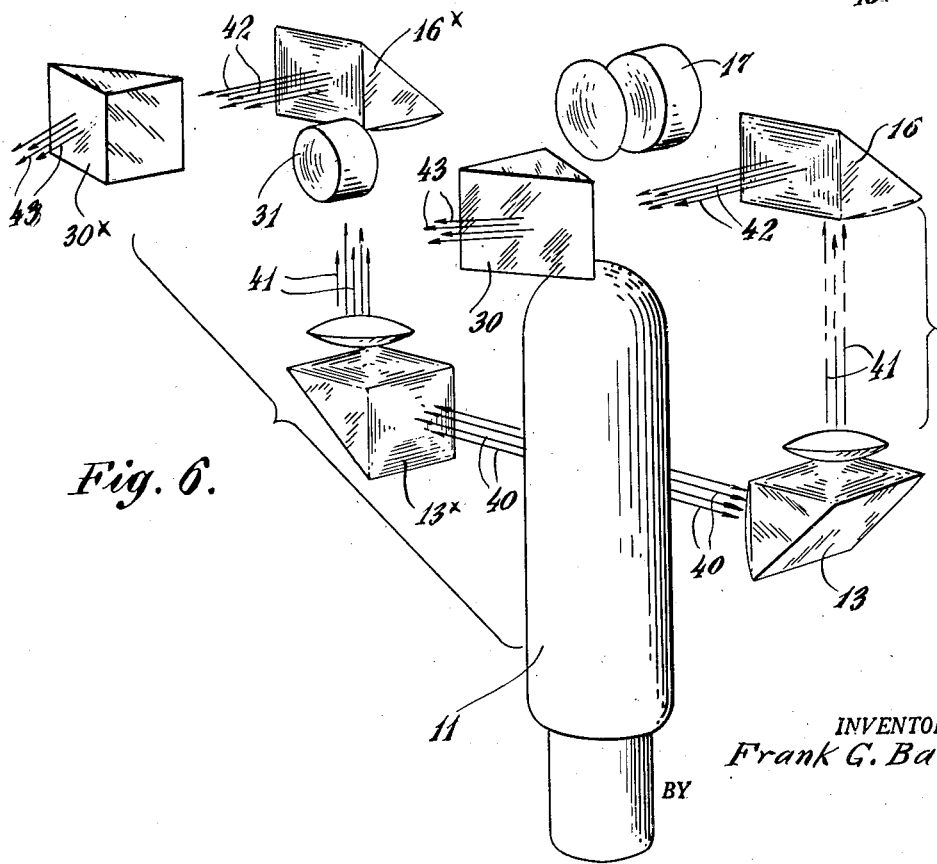
Fig. 6 is a side elevational view in cross section, of Fig. 1, showing the illuminating arrangement with all its optical components in longitudinal section, schematically setting forth the light ray passage therethrough.

Referring now to the drawings, it will be seen that a housing 10 is provided which is adapted to contain within electric bulb 11 which is fastened into socket 12, which socket 12 is fixedly located in the bottom section 15 of housing 10. Equidistant on each side of bulb 11, prisms 13 and 13x are located which are provided with condenser components 14 and 14x which are spaced upwardly at a predetermined distance over said prisms 13 and 13x, respectively. Prisms 16 and 16x are located above the condensers 14 and 14x and are parallel with and equidistant on each side from the camera objective lens 17. The prisms 13 and 13x and the condenser system 14 and 14x may suitably be attached to the rear wall portion 18 of the housing 10. Prisms 16 and 16x may suitably be attached in a fixed position to the front portion of the camera.

The rearward portion of the housing 10 is suitably provided with an aperture 19 adapted to receive camera means 20 within.

The camera means 20 is comprised of a boxlike structure 21 which contains the conventional equipment for photographic plates or film. The usual camera objective lens 17 is provided together with the mount 22 at the forward end of the camera. One of the two parts, either the box 21 or the objective lens 17 is adjustable relative to the other to permit adjustment of the spacing and focusing of the equipment. In the form illustrated, the boxlike structure 21 is located rearward of the housing 10 and fitted into the aperture 19 in order to permit easy access to the boxlike structure 21 for film loading or removal operations. The bellows, or box member 23, extends through the aperture 19 of the housing rear wall portion 18.

The upper plate 24, which forms the top section of the housing 10, is provided with a square slot 25 which may also be rectangular. A frame arrangement 26 comprised of a straight center portion 27 which may be in the shape of a rod, a frame 28 at right angles to said rod and fixedly connected therewith, a frame 29 at right angles to said rod 27 and fixedly connected therewith is located at a predetermined distance from said first frame 28 and substantially symmetrically therewith.

Said frame arrangement 26 comprising two spaced frames 28 and 29 is adapted to be fixedly connected to the housing 10 by inserting frame 28 into slot 25.

Frame 28 is provided with equidistant spaced apertures 28x, 28xx and 28x on each side thereof and in the center, respectively. Said apertures 28x are adapted to receive prism wedges 30 and 30x which are permanently mounted in set apertures. Centrally within said frame 28, aperture 28xx is located which is adapted to receive adapter lens 31 permanently mounted therein.

Prism wedges 30 and 30x are adapted to direct the light beam received from prisms 16 and 16x respectively. While prisms 13 and 13x in combination with condenser lenses 14 and 14x are adapted to act as a condenser lens system, prisms 16 and 16x respectively act somewhat like a field lens system with relation to the light received from bulb 11 and from prism 13 and condenser 14 respectively. Prism wedges 30 and 30x are small angle prism wedges which are thus adapted to project the images which they receive without actually reproducing the image of the light bulb filament of bulb 11.

Referring now to the optical arrangement for illumination purposes, the said arrangement according to this invention is substantially comprised of light bulb 11, prism 13, condenser component 14, prism 16 and prism wedge 30. In this arrangement, prism 13 and condenser component 14 are adapted to act as a condensing system, while prism 16 is adapted to act somewhat like a field lens system, and prism wedges 30 located in frame 25 are adapted to direct the light rays received upon the object which is located at the point at which frame 29 is located, at a predetermined distance from frame 28. Thus the arrangement permits a proper illumination of the object in such manner that the entire object area is evenly illuminated because, whilst prisms 13 and 13x reproduce the light source or the filament of bulb 11, prism wedges 30 and 30x reproduce the condenser system image, i. e. the image of 13 and 14 respectively, upon the object area, thus passing the maximum quantity of light upon the object area.

Referring now to the focusing arrangement, the arrangement according to this invention is adapted to focus the camera suitable to predetermined conditions, particularly object distance, while at the same time this focusing system will also be effective in correcting aberrations which occur when conventional photographic lens systems (which are adjusted to infinity) are employed for short-object-distance photography. It will be seen that adapter lens 31 which is mounted in aperture 28xx of frame 28 together with adapter lens aperture 32 is adapted to accomplish the above set forth results, namely, the correct focusing of the camera. In this arrangement where frame 28 is inserted in slot 25 of housing 10 upper plate section 24, adapter lens 31 and adapter lens aperture 32 will therefore at all times be mounted at a predetermined distance from camera lens 17 and from the object located at frame 29.

In order to adapt the camera in this arrangement to operations at varying object distances, it is therefore merely necessary to replace frame arrangement 26 in slot 25 with another like frame arrangement in which center portion 27 is of a length adapted to accommodate for the required object distance.

Thus the frame arrangement 26, for focusing purposes, is comprised of a straight center portion 27, preferably in the shape of a rod, to which frame 28 and frame 29 are fixedly connected and depending therefrom at a 90° angle, said frames 28 and 29 being substantially symmetric with each other. Frame 29 is adapted to position the object at a predetermined distance which must be within the focal plane of adapter lens 31 which is located in aperture 29xxx together with adapter lens aperture 32. Thus, if rod shaped center portion corresponds in length to the focal plane of adapter lens 31 located in frame 28, then it is merely necessary to have several arrangements of the type of frame arrangement 26 wherein the distance of frame 28 to frame 29 corresponds to the focal plane of adapter lens 31 positioned in aperture 29xxx of frame 28. Thus, as the distances in which frames 28 and 29 are spaced from each other are determined by the length of rod shaped center portion 27, it is merely necessary to have rod shaped center portion 27 always constructed in such length as will correspond to the focal plane of adapter lens 31 fixedly located in aperture 29xxx of frame 28.

In accordance with the arrangement set forth on known object distances, it is therefore merely necessary to substitute the frame arrangement 26 in slot 25, which is required for the known object distance and the adapter lens 31 will be adapted to automatically focus the camera properly for the required object distance. Thus it is possible to retain frame 28 in a predetermined position at all times, varying merely in the frame arrangement 26, the length of rod shaped center portion 27 in accordance with the focal plane of the adapter lens 31 located in aperture 29xxx of frame 28, and naturally thus the distance of frame 29 from frame 28 will always correspond to the location of the focal plane of adapter lens 31, thus positioning the object properly.

Referring now to the optical system adapted for illumination purposes, it will be seen that axis 40 and axis 41 intersect each other at right angles in prism 13 and 13x, and axis 41 again intersects in prism 16 at right angles with axis 42, axis 42 being directed to the object as beam 43 by prism wedges 30 and 30x. Thus, a beam will be transmitted by the condenser system 13 and 14 to the prism system 16 which acts somewhat like a field lens system, transmitting said beam to the prism wedges 30 and 30x which direct said beam to the object area. The beam will be transmitted by the condenser system 13 and 14 to the prism system 16 which will image the light bulb filament of light bulb 11 upon prism wedges 30 and 30x respectively, which in turn will image the condenser system, namely, prism 13 and condenser 14, upon the object area. In this manner the object area will be evenly illuminated because the filament image of bulb 11 will not be reproduced at the object location.

In using a camera according to my invention, conventional light switch 33 may be actuated in order to operate bulb 11. A light beam thus will pass from bulb 11 through condenser system comprised by prism 13 and condenser lens 14 and from there into prism 16 which acts somewhat as a field lens system and directs said beam into prism wedges 30 and 30x which are located in frame 28 somewhat ahead of prisms 16 and 16x. Prism wedges 30 and 30x direct the light beam to the object area. When the camera is properly trained upon the object and the object distance is predetermined, the camera is then properly focused by inserting frame arrangement 27 in such manner that the focal plane of lens 31 which is an adapter lens and which is located in aperture 29xxx, corresponds to the length of the rod shaped center portion of the frame arrangement. By substituting suitable frame arrangements with corresponding adapter lenses in accordance with the required object distances, the camera will remain properly focused while at the same time it remains permanently mechanically adjusted in its original condition and position.

It will be apparent that the frame arrangements, namely, comprising the various adapter lenses, suitable for focusing, may be employed for focusing purposes or in order to correct the deficiences of short object distance photography without the concurrent use of the illuminating system.

Furthermore, it is obvious that the illuminating system comprising the light source, the condenser system and the prismatic system adapted to function thus, may be used as illuminating means independent of the focusing means, namely, when the adapter lens is removed from its aperture.

Thus, the cooperation of the optical arrangements set forth has been shown and it is seen how desired results are obtained by means of coordinating the focusing and the illuminating system or by separately using either of them.

It will be apparent to those skilled in the art that alterations and modifications in the structure illustrated and described, and in the arrangement of the optical means set forth can be made, without departing thereby from the spirit of the invention set forth which shall be limited only by the scope of the appended claim.

Having set forth and subscribed my invention, what I desire to claim and secure by Letters Patent, is:

An optical focusing and illuminating device, comprising in combination, a housing, means to fixedly retain a photographic camera within the back portion thereof, means adapted to receive a conventional light source in the bottom portion of said housing, said light source being positioned below the body of said camera, two prisms located at the sides of said light source and spaced equidistant therefrom, condenser components, spaced at a predetermined distance above said two prisms, two deflecting prisms, spaced above said condenser components said two deflecting prisms located at the sides of, and substantially parallel with the objective of said camera; the top portion of said housing provided with means adapted to receive and retain a frame unit therein, said frame unit consisting of two spaced frames, the first of said frames adapted to enter into a fixed relation with said housing, a cross bar connected to said first frame and said second frame, adapted to maintain said second frame in a fixed position, parallel to said first frame, at a predetermined, fixed distance therefrom, an adapter lens and corresponding aperture centrally located within said first frame, said adapter lens being coaxially aligned with said camera objective, when said frame unit is positioned in said housing, small prism wedges located at the sides of said adapter lens being spaced equidistant therefrom said prism wedges positioned in alignment with said deflecting prisms when said frame unit is positioned in said housing, said deflecting prisms adapted to direct light rays emanating from said light source upon said prism wedges, said prism wedges adapted to deflect said light rays upon the object, said adapter lens adapted to collimate the object, said second frame adapted to position the object within the focal plane of said adapter lens, the distance between said first and said second frame unit being determined by the focal length of the adapter lens and the desired magnification, said frame unit being exchangeable in accordance with the varying requirements of different object distances.

FRANK G. BACK.

REFERENCES CITED

The following references are of record in the file of this patent:

UNITED STATES PATENTS

| Number | Name | Date |
| --- | --- | --- |
| 1,760,208 | Pfeiffer et al. | May 27, 1930 |
| 1,960,722 | Alderman | May 29, 1934 |
| 2,006,007 | Zimmer | June 25, 1935 |
| 2,146,506 | Maisch | Feb. 7, 1939 |
| 2,148,574 | Muller | Feb. 28, 1939 |
| 2,235,355 | Brown | Mar. 18, 1941 |
| 2,239,379 | Bucky | Apr. 22, 1941 |
| 2,241,300 | Gale | May 6, 1941 |
| 2,244,409 | Upton | June 3, 1941 |
| 2,305,437 | Meyers et al. | Dec. 15, 1942 |